(12) United States Patent  (10) Patent No.: US 7,948,478 B2
Chuang  (45) Date of Patent: May 24, 2011

(54) ELECTRICAL TOUCH PAD REGULATING SENSITIVITY BASED ON AMBIENT HUMIDITY AND METHOD THEREOF

(75) Inventor: Tsung-Jen Chuang, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 852 days.

(21) Appl. No.: 11/853,833

(22) Filed: Sep. 12, 2007

(65) Prior Publication Data

US 2008/0252613 A1    Oct. 16, 2008

(30) Foreign Application Priority Data

Apr. 10, 2007  (CN) .......................... 2007 1 0200420

(51) Int. Cl.
   *G06F 3/041*  (2006.01)
(52) U.S. Cl. .................. 345/173; 178/18.01; 178/18.02
(58) Field of Classification Search .......... 345/173–178; 178/18.01–18.11
   See application file for complete search history.

(56) References Cited

U.S. PATENT DOCUMENTS

| | | | | |
|---|---|---|---|---|
| 3,649,877 A | * | 3/1972 | Friedman et al. | 361/188 |
| 3,831,707 A | * | 8/1974 | Takeuchi | 180/272 |
| 4,161,660 A | * | 7/1979 | Gallant | 307/118 |
| 4,330,718 A | * | 5/1982 | Kinomoto et al. | 307/118 |
| 4,333,490 A | * | 6/1982 | Enter, Sr. | 137/78.3 |
| 4,386,336 A | * | 5/1983 | Kinomoto et al. | 338/35 |
| 4,449,188 A | * | 5/1984 | Unoguchi et al. | 700/276 |
| 4,476,463 A | * | 10/1984 | Ng et al. | 345/174 |
| 4,575,581 A | * | 3/1986 | Langberg | 178/18.02 |
| 4,680,429 A | * | 7/1987 | Murdock et al. | 178/20.02 |
| 5,856,822 A | * | 1/1999 | Du et al. | 345/73 |
| 5,889,466 A | * | 3/1999 | Ferguson | 340/602 |
| 6,006,010 A | * | 12/1999 | Hada et al. | 358/1.7 |
| 6,114,682 A | * | 9/2000 | Minakuchi et al. | 250/205 |
| 7,687,736 B2 | * | 3/2010 | Auger et al. | 200/600 |
| 7,714,846 B1 | * | 5/2010 | Gray | 345/173 |
| 2002/0125222 A1 | * | 9/2002 | Iwase et al. | 219/121.8 |
| 2004/0183787 A1 | * | 9/2004 | Geaghan et al. | 345/173 |
| 2005/0253777 A1 | * | 11/2005 | Zehner et al. | 345/1.3 |
| 2006/0007181 A1 | * | 1/2006 | Jung et al. | 345/173 |
| 2006/0251439 A1 | * | 11/2006 | Sugiyama | 399/68 |
| 2007/0139387 A1 | * | 6/2007 | Liao | 345/173 |
| 2008/0028853 A1 | * | 2/2008 | Cerutti | 73/335.05 |

FOREIGN PATENT DOCUMENTS

| | | |
|---|---|---|
| CN | 1815429 A | 8/2006 |
| JP | 10003349 A * | 1/1998 |

* cited by examiner

*Primary Examiner* — Amare Mengistu
*Assistant Examiner* — Gene W Lee
(74) *Attorney, Agent, or Firm* — Frank R. Niranjan

(57) ABSTRACT

An electrical touch pad includes a touch sensor for detecting operational inputs, and generating analog signals according to the operational inputs; a touch detection unit for receiving analog signals, amplifying the analog signals by a controllable gain to generate amplified analog signals, converting the amplified analog signals to generate digital signals, and sending the digital signals to a processor to determine a touched location; a humidity detection unit for detecting ambient humidity and determining a humidity level; and a humidity compensation unit for receiving the humidity level, generating a gain regulation signal to control the touch detection unit to regulate the controllable gain according to the humidity level. Thereby, in erratic behavior of the electrical touch pad can be prevented and stability of the touch pad is enhanced. A related method for regulating sensitivity of the electrical touch pad is also provided.

13 Claims, 4 Drawing Sheets

ELECTRICAL TOUCH PAD REGULATING SENSITIVITY BASED ON AMBIENT HUMIDITY AND METHOD THEREOF

BACKGROUND OF THE INVENTION

1. Field of the Invention

The present invention relates to a device and method for regulating sensitivity of input devices, and especially to a method for regulating sensitivity of an electrical touch pad and the electrical touch pad using the same.

2. Description of Related Art

Touch pads are one type of popular input devices. The touch pads are often incorporated in electrical devices, such as portable computers, and functioned as a mouse. Touch pads have an operating surface that is physically touched by users. One of the most common types of the touch pads can be called an electrical touch pad comprising a resistive touch pad and a capacitive touch pad. The electrical touch pad generally includes a sensor for sensing inputs of the user, thus generating analog signals according to the inputs.

When the sensor of the electrical touch pad is activated, change in electrical current can be detected and measured by the electrical touch pad, thereby the inputs are processed. For example, the sensor of the capacitive touch pad typically includes a substrate which supports a first and a second interleaved, closely spaced, non-overlapping arrays of conductive plates. An insulating layer overlies the first and the second arrays. When an outer surface of the insulating layer is touched, the capacitances of at least one of the columns of plates of the first array and at least one of the rows of plates of the second array underlying the insulating layer at a location being touched exhibits a change with respect to ambient ground. Based upon the measured capacitance of each column of the first array and each row of the second array, signals representing the coordinates of the location being touched can be generated by a processor electrically connected to the sensor. These signals may be used, for example, to control a position of a cursor on a display screen of a portable computer or to make a select operation. However, changes in ambient humidity may result in erratic behavior of the electrical touch pad.

Therefore, a heretofore unaddressed need exists in the industry to overcome the aforementioned deficiencies and inadequacies.

SUMMARY OF THE INVENTION

A method for regulating sensitivity of an electrical touch pad and the electrical touch pad using the same are provided. The electrical touch pad regulates a controllable gain for amplifying analog signals generated by a sensor according to changes of ambient humidity, thereby in erratic behavior of the electrical touch pad can be prevented and stability of the electrical touch pad is enhanced.

The electrical touch pad includes a touch sensor, a touch detection unit, a humidity detection unit, and a humidity compensation unit. The touch sensor senses operational inputs, and generates analog signals according to the operational inputs. The touch detection unit receives analog signals, amplifies the analog signals by a controllable gain, converts amplified analog signals to generate digital signals, and sends the digital signals to a processor. The humidity detection unit detects ambient humidity and determines a humidity level. The humidity compensation unit receives the humidity level, generates a gain regulation signal to control the touch detection unit to regulate the controllable gain according to the humidity level.

Other advantages and novel features will become more apparent from the following detailed description of preferred embodiments when taken in conjunction with the accompanying drawings.

DETAILED DESCRIPTION OF THE INVENTION

The present features and functions involve in regulating the sensitivity of an electrical touch pad which can be incorporated in electronic devices, such as a computer and a touch screen. The following detailed descriptions of exemplary and preferred embodiments are made with reference to the attached drawings.

Figure 1:
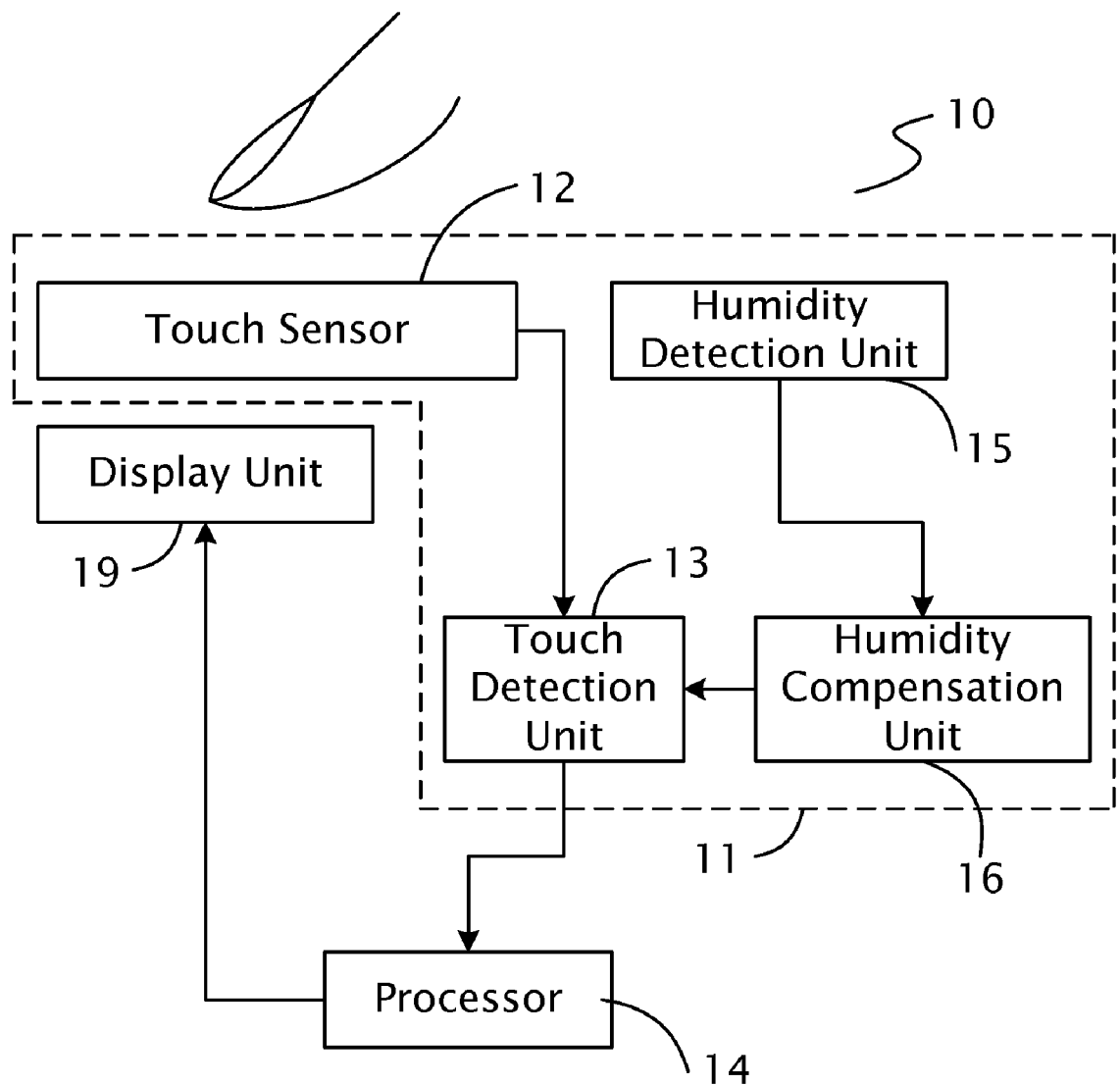
FIG. 1 is a block diagram of hardware infrastructure of an touch screen of the present invention.

FIG. 1 is a block diagram of hardware infrastructure of the touch screen. The touch screen 10 includes an electrical touch pad 11, a processor 14, and a display unit 19. The electrical touch pad 11 is configured for receiving operational inputs inputted by users, thus generating corresponding analog signals. The processor 14 processes the analog signals. The display unit 19 provides a visual interface to display the information.

The electrical touch pad 11 includes a touch sensor 12, a touch detection unit 13, a humidity detection unit 15, and a humidity compensation unit 16.

The touch sensor 12 overlies an output surface of a display screen (not shown) of the display unit 19. The touch sensor 12 detects the operational inputs at a touched location, generates the analog signals according to the operational inputs, and sends the analog signals to the touch detection unit 13.

The touch detection unit 13 amplifies the analog signals by a controllable gain, converts amplified analog signals to generate digital signals, and sends the digital signals to the processor 14. An initial value of the controllable gain is defined when the touch screen 10 is powered on. The touch detection unit 13 can amplify the analog signals through a programmable logic device or an auto gain control circuit.

The processor 14 analyzes the digital signals, and generates output signals corresponding coordinates of the touched location. The output signals may be used, for example, to control a position of a cursor on the display unit 19 or to perform a selection operation.

The humidity detection unit 15 is configured for detecting ambient humidity, determining a humidity level of the ambient humidity, and sending the humidity level to the humidity compensation unit 16. The humidity level is a numerical value that represents a level of the ambient humidity. The humidity detection unit 15 can be the integrated humidity-temperature sensor similar to model SHT1x/SHT7x made by Sensirion.

The humidity compensation unit 16 generates a gain regulation signal according to the humidity level, and sends the gain regulation signal to the touch detection unit 13. The gain regulation signal is used for controlling the touch detection unit 13 to regulate the controllable gain.

Figure 2:
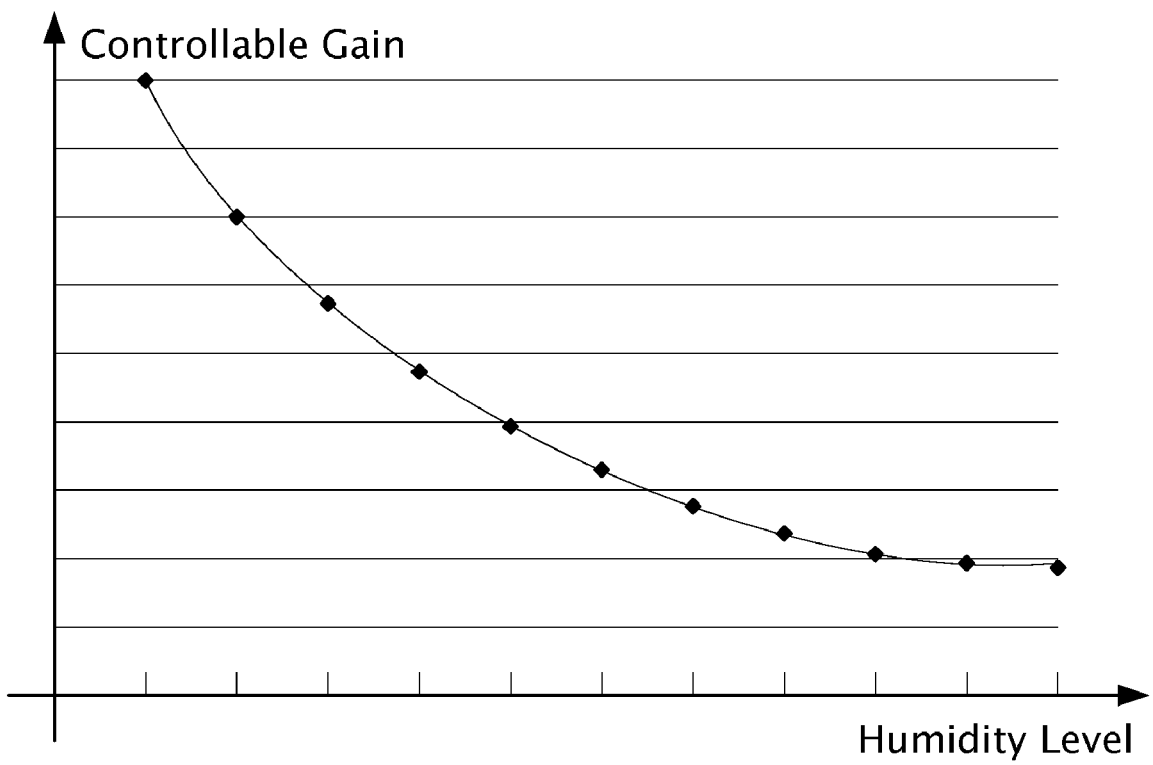
FIG. 2 is a linear function diagram showing a relationship between a predetermined gain and a humidity level.

FIG. 2 depicts a linear function diagram showing a relationship between the controllable gains and the humidity levels. The conductivity of the touch sensor 12 becomes stronger when the humidity level is high, thus the signal becomes stronger. Therefore the controllable gain of the touch detection unit 13 needs to be reduced. On the contrary, the conductivity of the touch sensor 12 becomes weaker when the humidity level is low, thus the signal becomes weaker. Therefore the controllable gain of the touch detection unit 13 needs to be increased. When the humidity compensation unit 16 regulates the controllable gain of the touch detection unit 13 according to the humidity levels, in erratic behavior of the electrical touch pad can be prevented and stability of the electrical touch pad 11 is enhanced.

Figure 3:
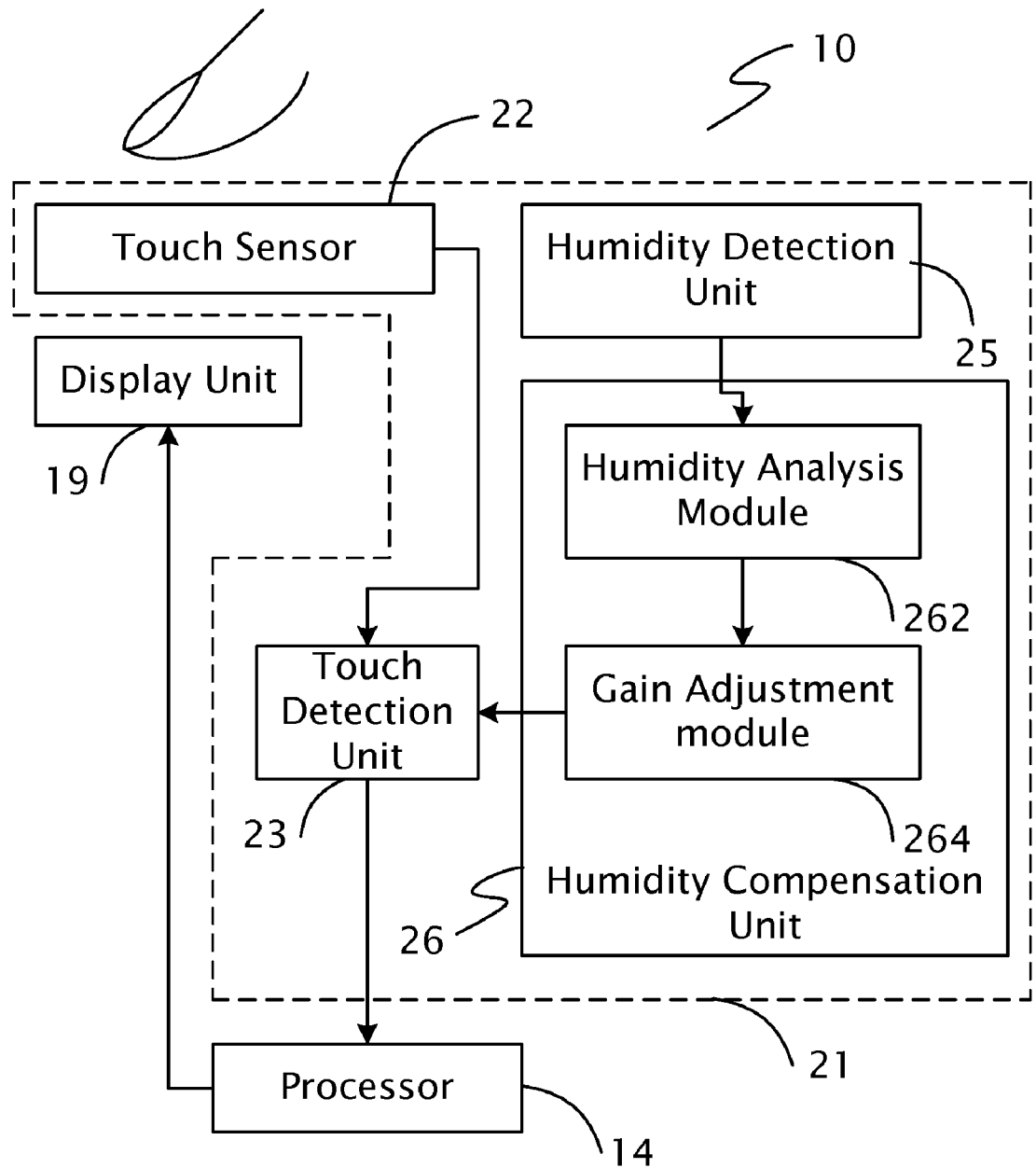
FIG. 3 is a block diagram of hardware infrastructure of an electrical touch pad according to an exemplary embodiment of the present invention.

FIG. 3 is a block diagram of hardware infrastructure of the electrical touch pad according to an exemplary embodiment. In this exemplary embodiment, the electrical touch pad 21 includes a touch sensor 22, a touch detection unit 23, a humidity detection unit 25, and a humidity compensation unit 26. The touch sensor 22, the touch detection unit 23, and the humidity detection unit 25 co-operatively perform the same function as the touch sensor 12, the touch detection unit 13, and the humidity detection unit 15 in FIG. 1.

The humidity compensation unit 26 includes a humidity analysis module 262 and a gain adjustment module 264. The humidity analysis module 262 receives the humidity level determined by the humidity detection unit 25, and compares the humidity level with a high threshold. If the humidity level is higher than the high threshold, the gain adjustment module 264 generates a first gain regulation signal to control the touch detection unit 23 to decrease the controllable gain. If the humidity level is lower than or equal to the high threshold, the humidity analysis module 262 compares the humidity level with a low threshold. If the humidity level is lower than the low threshold, the gain adjustment module 264 generates a second gain regulation signal to control the touch detection unit 23 to increase the controllable gain. If the humidity level is higher than or equal to the low threshold, the gain adjustment module 264 does not generate any of the gain regulation signals.

Figure 4:
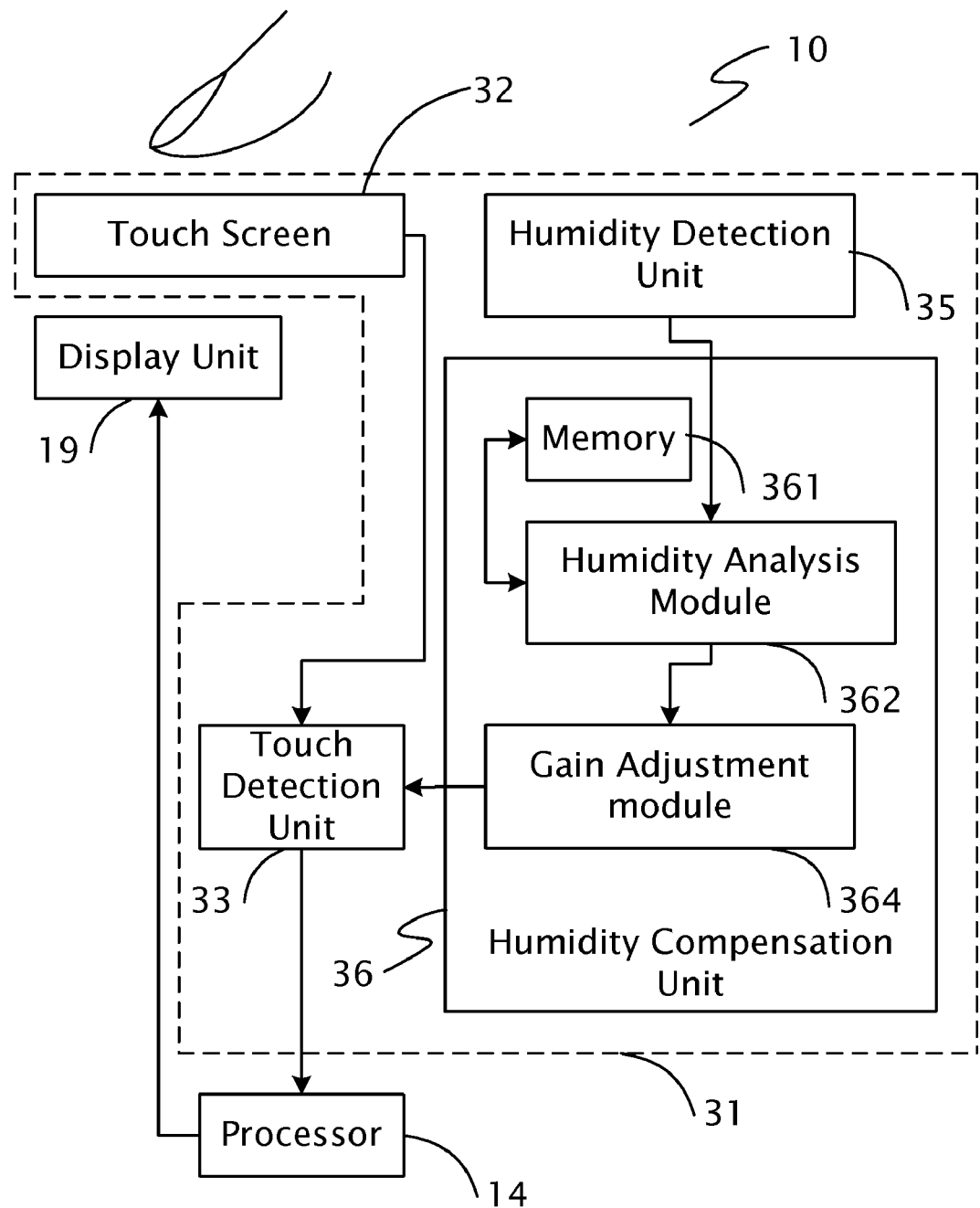
FIG. 4 is a block diagram of hardware infrastructure of the electrical touch pad according to an alternative embodiment of the present invention.

FIG. 4 is a block diagram of hardware infrastructure of the electrical touch pad according to an exemplary embodiment. In this exemplary embodiment, the electrical touch pad 31 includes a touch sensor 32, a touch detection unit 33, a humidity detection unit 35, and a humidity compensation unit 36. The touch sensor 32, the touch detection unit 33, and the humidity detection unit 35 co-operatively perform the same function as the touch sensor 12, the touch detection unit 13, and the humidity detection unit 15 in FIG. 1.

The humidity compensation unit 36 includes a memory 361, a humidity analysis module 362, and a gain adjustment module 364. The memory 361 stores a plurality of predetermined gain values corresponding to the humidity levels. The humidity analysis module 362 searches the memory 361 to obtain one of the predetermined gain values corresponding to a humidity level received from the humidity detection unit 35. The gain adjustment module 364 generates the gain regulation signal to control the touch detection unit 13 to regulate the controllable gain according to the obtained predetermined gain value.

In an alternative preferred embodiment, the memory 361 stores an arithmetic function program indicating that a predetermined gain value is a function of a humidity level. The humidity analysis module 362 performs the arithmetic function program to obtain the predetermined gain value corresponding to the received humidity level.

It is understood that the invention may be embodied in various other forms without departing from the spirit thereof. Thus, the present examples and embodiments are to be considered in all respects as illustrative and not restrictive, and the invention is not to be limited to the details given above.

What is claimed is:

1. An electrical touch pad comprising:
   a touch sensor for detecting operational inputs, and generating analog signals according to the operational inputs;
   a touch detection unit for receiving the analog signals, amplifying the analog signals by a controllable gain to generate amplified analog signals, converting the amplified analog signals to generate digital signals, and sending the digital signals to a processor to determine a touched location;
   a humidity detection unit for detecting ambient humidity and determining a humidity level; and
   a humidity compensation unit for receiving the humidity level, generating a gain regulation signal to control the touch detection unit to regulate the controllable gain according to the humidity level.

2. The electrical touch pad according to claim 1, wherein the humidity compensation unit comprises a humidity analysis module and a gain adjustment module; the humidity analysis module compares the humidity level with a high threshold; if the humidity level is higher than the high threshold, the gain adjustment module generates the gain regulation signal to signal the touch detection unit to decrease the controllable gain.

3. The electrical touch pad according to claim 2, wherein the humidity analysis module compares the humidity level with a low threshold; if the humidity level is lower than the low threshold, the gain adjustment module generates the gain regulation signal to control the touch detection unit to increase the controllable gain.

4. The electrical touch pad according to claim 3, wherein the gain adjustment module does not generate any gain regulation signals when the humidity level is between the low threshold and the high threshold.

5. The electrical touch pad according to claim 1, wherein the humidity compensation unit comprises a humidity analysis module and a gain adjustment module; the humidity analysis module obtains a predetermined gain value corresponding to the humidity level received from the humidity detection unit; the gain adjustment module generates the gain regulation signal according to the predetermined gain value.

6. The electrical touch pad according to claim 5, wherein the humidity compensation unit further comprises a memory for storing a plurality of predetermined gain values corresponding to humidity levels; the humidity analysis module searches the memory to obtain one of the predetermined gain values corresponding to the humidity level.

7. The electrical touch pad according to claim 5, wherein the humidity compensation unit further comprises a memory for storing an arithmetic function program indicating that a predetermined gain value is a function of a humidity level; the humidity analysis module performs the arithmetic function program to obtain the predetermined gain value corresponding to the humidity level.

8. A method for regulating sensitivity of an electrical touch pad, comprising:
   receiving analog signals generated by the electrical touch pad;
   amplifying the analog signals by a controllable gain to generate amplified analog signals;

detecting ambient humidity;

determining a humidity level;

generating a gain regulation signal for regulating the controllable gain according to the humidity level;

regulating the controllable gain according to the gain regulation signal;

converting the amplified analog signals to generate digital signals; and determining a touched location according to the digital signals.

9. The method for regulating sensitivity of electrical touch pad according to claim 8, wherein the method of generating a gain regulation signal comprises:

comparing the humidity level with a high threshold; and generating the gain regulation for decreasing the controllable gain if the humidity level is higher than the high threshold.

10. The method for regulating sensitivity of electrical touch pad according to claim 9, wherein the method of generating the gain regulation signal further comprises:

comparing the humidity level with a low threshold; and generating the gain regulation for increasing the controllable gain if the humidity level is lower than the low threshold.

11. The method for regulating sensitivity of electrical touch pad according to claim 8, wherein the method of generating the gain regulation signal comprises:

obtaining a predetermined gain value corresponding to the humidity level; and generating the gain regulation signal according to the predetermined gain value.

12. The method for regulating sensitivity of electrical touch pad according to claim 11, wherein the method of obtaining the predetermined gain value comprises:

providing a memory for storing a plurality of predetermined gain values corresponding to humidity levels;

searching the memory to obtain one of the predetermined gain values corresponding to the humidity level.

13. The method for regulating sensitivity of electrical touch pad according to claim 11, wherein the method of obtaining the predetermined gain value comprises:

providing a memory for storing an arithmetic function program, the arithmetic function program indicates that a predetermined gain value is a function of a humidity level; and performing the arithmetic function program to obtain one of the predetermined gain values corresponding to the humidity level.

\* \* \* \* \*